United States Patent [19]

Brockmeyer

[11] 4,331,621
[45] May 25, 1982

[54] METHOD FOR BONDING A GASKET SEAL TO SURFACE OF CERAMIC FOAM FILTER

[75] Inventor: Jerry W. Brockmeyer, Hendersonville, N.C.

[73] Assignee: Swiss Aluminium Ltd., Chippis, Switzerland

[21] Appl. No.: 245,503

[22] Filed: Mar. 19, 1981

[51] Int. Cl.³ .............................................. B29H 7/20
[52] U.S. Cl. ...................................... 264/44; 264/59; 264/60
[58] Field of Search .................... 264/44, 46.5, 59, 60, 264/86

[56] References Cited

U.S. PATENT DOCUMENTS

| | | | |
|---|---|---|---|
| 3,845,181 | 10/1974 | Ravault | 264/59 |
| 3,893,917 | 7/1975 | Pryor et al. | 210/510 |
| 3,947,363 | 3/1976 | Pryor et al. | 210/510 |
| 3,975,165 | 8/1976 | Elbert et al. | 264/60 |
| 4,056,586 | 11/1977 | Pryor et al. | 264/44 |
| 4,081,371 | 3/1978 | Yarwood et al. | 210/69 |

Primary Examiner—Donald E. Czaja
Assistant Examiner—W. Thompson
Attorney, Agent, or Firm—Bachman and LaPointe

[57] ABSTRACT

A method for integrally bonding a gasket seal to the bevelled peripheral surface of a ceramic foam filter used in the filtration of molten metal.

3 Claims, No Drawings

METHOD FOR BONDING A GASKET SEAL TO SURFACE OF CERAMIC FOAM FILTER

BACKGROUND OF THE INVENTION

Molten metal, particularly molten aluminum, in practice generally contains entrained solids which are deleterious to the final cast metal product. These entrained solids appear as inclusions in the final cast product after the molten metal is solidified and cause the final product to be less ductile or to have poor bright finishing and anodizing characteristics. The inclusions may originate from several sources. For example, the inclusions may originate from surface oxide films which become broken up and are entrained in the molten metal. In addition, the inclusions may originate as insoluble impurities, such as carbides, borides and others or eroded furnace and trough refractories.

Porous ceramic foam materials are known to be particularly useful in filtering molten metal, as described in U.S. Pat. No. 3,893,917 for "Molten Metal Filter" by Michael J. Pryor and Thomas J. Gray, patented July 8, 1975, and also as described in U.S. Pat. No. 3,947,363 for "Ceramic Foam Filter" by Michael J. Pryor and Thomas J. Gray, patented Mar. 30, 1976 and U.S. Pat. No. 4,081,371 for "Filtering of Molten Metal" by John C. Yarwood, James E. Dore and Robert K. Preuss, patented Mar. 28, 1978, all of which are assigned to the assignee of the instant invention and incorporated herein by reference.

These ceramic foam materials are particularly useful for filtering molten metal for a variety of reasons included among which are their excellent filtration efficiency, low cost, ease of use and ability to use same on a disposable, throwaway basis. The fact that these ceramic foam filters are convenient and inexpensive to prepare and may be used on a throwaway basis requires the development of means for easily and conveniently assembling and removing porous, molten metal filters from a filtration unit while providing a highly efficient filtration assembly. Since the filters are designed to be a throwaway item, it is essential to provide an effective means of sealing the filters in place in its holder which is easy to assemble, disassemble and clean up. The holder or filter chamber itself is normally an integral part of a trough, pouring pan or tundish, etc. and should be constructed of refractory materials resistant to the molten metal similar to those used in standard trough construction. It is greatly preferred to seal the filter plate in place using a resilient sealing means or gasket type seal peripherally circumscribing the filter plate at the bevelled portion thereof. The gasket type seals ensure a leak free installation and also provide an effective parting medium which is essential for ease of disassembly. In addition, since the gaskets or sealing means prevent ingress of metal to the sealing faces of the holder unit, their use considerably eases clean up and effectively prolongs the life of the unit by eliminating problems of metal attack. Furthermore, because of its resiliency, the gasket may provide sufficient frictional force to hold the filter body in place in the holder or filter chamber without resorting to other types of hold down devices. The resilient sealing means should be non-wetting to the particular molten metal, resist chemical attack therefrom and be refractory enough to withstand the high operating temperatures.

Heretofore, the ceramic foam filters were gasketed with pre-cut strips of low density ceramic fiber having an organic binder. The straight pre-cut strips were simply taped to the bevelled edges of the filters after the filter had been baked and fired. As a result of the foregoing process, a number of disadvantages arose. Firstly, as the gasket is merely taped to the filter the fit is relatively loose and thus the gasket can be easily damaged during handling of the filter. Secondly, since the pre-cut strips are straight and the edges of the filter which are to be sealed are bevelled, a misfit occurs which in some cases results in the molten metal passing between the gasket and filter plate. Finally, as the gasket material is not taped to the filter until after it is fired, the filter must be dressed, that is coating the edges with additional ceramic slurry, in order to insure that the edges of the filter are not directly handled during further processing.

Naturally, it would be highly desirable to develop a process for integrally bonding a gasket onto a ceramic foam filter which overcomes the above-noted disadvantages.

Accordingly, it is a principal object of the present invention to provide an improved method and apparatus for integrally bonding a gasket seal onto a ceramic foam filter used in the filtration of molten metal.

It is a particular object of the present invention to provide an integrally bonded gasket on a ceramic foam filter which uniformly seats on the bevelled edges of the filter.

It is a still further object of the present invention to provide improvements as aforesaid which are convenient and inexpensive to utilize and which result in improved sealing of the filter in the filter chamber.

Further objects and advantages of the present invention will appear hereinbelow.

SUMMARY OF THE INVENTION

In accordance with the present invention it has been found that the foregoing objects and advantages may be readily obtained.

The present invention provides an improved method and apparatus for integrally bonding a gasket seal onto the bevelled edges of a ceramic foam filter used in the filtration of molten aluminum. The ceramic foam filter having an integrally bonded gasket bonded in accordance with the method of the present invention uniformly seats on the bevelled surfaces of the filter plate and allows for consistent control of exterior dimensions of the filter plate thereby insuring a uniform seating of the filter in the filter chamber thereby reducing the possibility of metal bypassing the filter. In addition, the uniform seating of the filter in the filter chamber reduces stresses on the filter which are created by a non-uniform seating of the filter in the filter chamber.

In accordance with the method of the present invention a mold is provided having dimensions corresponding to the desired final filter size which is to be inserted in the filter chamber when used in the filtration of molten metal. A wet slurry impregnated foam material is centered in the mold leaving a gap between the mold and the impregnated foam. The gap is then filled with a ceramic fiber slurry consisting of a ceramic fiber, organic and/or inorganic binders and a suitable vehicle, usually water. If a viscous non-flowing slurry is used it is possible to remove the mold prior to drying. However, if thinner slurries are used, it is necessary to provide a porous mold which would be maintained about the part until dried. The part is then fired using the practices disclosed in the aforesaid U.S. Pat. Nos.

3,893,917, 3,947,363 and 4,081,371. Alternatively, the gasket could be applied to a dried and fired ceramic part in the same manner as outlined above. However, in this case an additional drying operation would be required to integrally bond the gasket to the ceramic body.

Accordingly, it can be seen that the present invention provides an improved filter plate for use in the filtration of molten metal having an integrally bonded gasket secured thereto which is adapted to mate with a corresponding bevelled surface in a filter chamber. By providing an integrally bonded gasket on the ceramic foam filter in accordance with the method of the present invention, dressing of the filter edges is eliminated, the exterior dimensions of the part are determined by the dimensions of the mold rather than the filter itself and the gasket will be baked out prior to use as a filter for molten metal. The elimination of dressing reduces the number of personnel required for the production of the final product thereby resulting in a corresponding decrease in the overall cost. Consistent control of the exterior dimensions of the filter plate by using a mold in accordance with the present invention allows for a more uniform seating of the filter on the corresponding bevelled surface of the filter chamber thereby reducing any possibility of metal bypassing the filter. Likewise, any stresses created on the filter which would result from poor seating are reduced. Finally, the prefiring of the gasket with the filter would reduce any possibility of the gasket regassing the metal during filtration even if the filter and gasket were not properly preheated in the filter chamber prior to passing molten metal therethrough.

As indicated hereinabove, the method of the present invention provides a filter plate having an integrally bonded gasket which offers considerable advantages over previously known gasketed filter plates. Thus, for example, the method of the present invention enables one to produce gasketed filter plates of dimensional integrity which allows for a uniform seating of the filter element in the filter chamber and thereby assures superior filtration efficiencies by eliminating any possibility of metal bypassing the filter due to poor seating of the filter element in the filter chamber.

In addition to the foregoing, the present invention contemplates a fiber containing slurry for use in preparing the bonded gasket.

DETAILED DESCRIPTION

In accordance with the present invention a ceramic foam filter is prepared in accordance with the general procedure outlined in U.S. Pat. No. 3,893,917. As described therein, an open cell, flexible organic foam material is provided having a plurality of interconnected voids surrounded by a web of said foam material. A suitable aqueous slurry, such as that described in the aforenoted U.S. patent, is prepared and the foam material is impregnated therewith so that the web is coated therewith and the voids are substantially filled therewith. The impregnated material is compressed to expel about 80% of slurry and the balance is uniformly distributed throughout the foam material, preferably so that some pores are blocked in a uniformly distributed manner to increase the tortuosity. The compression is thereafter released so that the web remains coated with the slurry.

In accordance with the method of the present invention, the slurry impregnated organic foam material is positioned in a mold having dimensions corresponding to the desired final filter size. The filter size corresponds to the opening provided in the filter chamber to be used in the filtration of molten metal. The slurry impregnated foam material is centered in the mold leaving a gap between the side walls of the mold and the side walls of the impregnated foam material. A suitable ceramic fiber slurry is prepared and the gap between the impregnated foam material and the side walls of the mold is filled with the ceramic fiber slurry. The material is then dried and then heated to first burn out the flexible organic foam and then sinter the ceramic thereby providing a fused ceramic foam having a plurality of interconnected voids surrounded by a web of bonded or fused ceramic and the configuration of the flexible foam and the side walls of the fused ceramic has an integrally bonded ceramic gasket secured thereto.

Depending on the nature of the slurry, it may be possible to remove the mold prior to drying. Thus, if a viscous non-flowing slurry is used the mold can be removed, however, if thinner slurries are used it becomes necessary to provide a porous mold which would be maintained about the part until dried. Alternatively, the gasket could be applied to a dried fired ceramic part in the same manner outlined above. However, in this case an additional drying operation would be required to integrally bond the gasket to the ceramic body.

The fiber containing slurry used to form the gasket in the present invention consists of the fiber itself, organic and/or inorganic bonders and a suitable vehicle, usually water. Possible binders could include but are not limited to methyl or ethyl cellulose, various gums, methyl or ethyl silicate, colloidal silica, clay or any of a number of other organic, inorganic or organometallic materials. The density of the finished material should be in the range of from about 4 lbs./ft.$^3$ to about 15 lbs./ft.$^3$. Generally, less than 4 lbs./ft.$^3$ would result in a gasket which is too weak for routine handling and greater than 15 lbs./ft.$^3$ would result in a gasket which is so stiff that it would be difficult to obtain proper seating of the filter element in the filter chamber.

The method of the present invention provides an improved filter plate for use in the filtration of molten metal having an integrally bonded gasket secured thereto which is adapted to mate with a corresponding bevelled surface in a filter chamber. By providing an integrally bonded gasket on the ceramic foam filter in accordance with the method of the present invention, dressing of the filter edges is eliminated, the exterior dimensions of the part are determined by the dimensions of the mold rather than the filter itself and the gasket will be baked out prior to use as a filter for molten metal. The elimination of dressing reduces the number of personnel required for the production of the final product thereby resulting in a corresponding decrease in the overall cost. Consistent control of the exterior dimensions of the filter plate by using a mold in accordance with the present invention allows for a more uniform seating of the filter on the corresponding bevelled surface of the filter chamber thereby reducing any possibility of metal bypassing the filter. Likewise, any stresses created on the filter which would result from poor seating are reduced. Finally, the prefiring of the gasket with the filter would reduce any possibility of the gasket regassing the metal during filtration even if the filter and gasket were not properly preheated in the filter chamber prior to passing molten metal therethrough.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for integrally bonding a gasket seal to the peripheral surface of a ceramic foam filter used in the filtration of molten metal comprising the steps of:
   (A) providing a ceramic slurry impregnated flexible organic foam material;
   (B) providing a mold having dimensions corresponding to the desired size of the final filter product;
   (C) positioning said slurry impregnated flexible organic foam material in said mold so as to form a gap between the peripheral surface of said flexible foam material and said mold;
   (D) feeding a ceramic fiber slurry to said gap formed between said impregnated foam material and said mold; and
   (E) drying and firing the molded part so as to burn out the flexible organic foam and sinter the ceramic so as to form a ceramic foam filter having a plurality of interconnected voids surrounded by a web of bonded ceramic having an integrally bonded ceramic gasket secured to the peripheral surface thereof.

2. A method according to claim 1 including the steps of removing the mold prior to drying and firing.

3. A method for integrally bonding a gasket seal to the peripheral surface of a ceramic foam filter used in the filtration of molten metal comprising the steps of:
   (A) providing a ceramic slurry impregnated flexible organic foam material;
   (B) providing a mold having dimensions corresponding to the desired size of the final filter product;
   (C) drying and firing the slurry impregnated flexible organic foam so as to burn out the flexible organic foam and sinter the ceramic so as to form a ceramic foam filter having a plurality of interconnected voids surrounded by a web of said ceramic;
   (D) positioning said ceramic foam filter in said mold so as to form a gap between the peripheral surface of said flexible foam material and said mold;
   (E) feeding a ceramic fiber slurry to said gap formed between said impregnated foam material and said mold; and
   (F) drying the molded part so as to form an integrally bonded gasket seal on the peripheral surface of the ceramic foam filter.

* * * * *